US010554730B2

(12) United States Patent
Campbell et al.

(10) Patent No.: US 10,554,730 B2
(45) Date of Patent: *Feb. 4, 2020

(54) MANAGING DOWNLOAD REQUESTS RECEIVED TO DOWNLOAD FILES FROM A SERVER

(71) Applicant: International Business Machines Corporation, Armonk, NY (US)

(72) Inventors: Daniel A. Campbell, Longmont, CO (US); Robert F. Pryor, Lynn Haven, FL (US); John B. Simmons, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,449

(22) Filed: Nov. 20, 2017

(65) Prior Publication Data

US 2018/0077220 A1  Mar. 15, 2018

Related U.S. Application Data

(63) Continuation of application No. 14/805,947, filed on Jul. 22, 2015, now Pat. No. 9,876,847, which is a (Continued)

(51) Int. Cl.
*H04L 29/06* (2006.01)
*G06F 15/16* (2006.01)
*H04L 29/08* (2006.01)

(52) U.S. Cl.
CPC .......... *H04L 67/06* (2013.01); *H04L 67/1085* (2013.01); *H04L 67/28* (2013.01); *H04L 67/42* (2013.01); *H04L 69/14* (2013.01)

(58) Field of Classification Search
CPC ..... H04L 43/10; H04L 43/0882; H04L 43/04; H04L 67/12; H04L 67/06; H04L 67/1085;
(Continued)

(56) References Cited

U.S. PATENT DOCUMENTS 6,633,901 B1    10/2003 Zuili
6,742,023 B1 *   5/2004 Fanning ................. H04L 29/06
                                                          709/219
(Continued)

FOREIGN PATENT DOCUMENTS

JP          11224235 A      8/1999

OTHER PUBLICATIONS

Liu et al., On the impact of concurrent downloads, 6 pages (Year: 2001).*
(Continued)

*Primary Examiner* — Thuy Dao
(74) *Attorney, Agent, or Firm* — Schmeiser, Olsen & Watts, LLP; Michael Petrocelli

(57) ABSTRACT

A method and system of managing downloads of a file from a server. A determination is made of whether or not a number of current connections between a client and the server is less than a preset threshold number, exceeding one, of allowable concurrent connections with the server. If the determination is that the number of current connections is less than the preset threshold number, responsive to a request by the client to download the file pursuant to another connection between the client and the server, the computer establishes the other connection between the client and the server and downloads the file to the client via the other connection. If the determination is that the number of current connections is at least the preset threshold number, the computer denies a request by the client to download the file from the server using another connection between the client and the server.

6 Claims, 3 Drawing Sheets

Related U.S. Application Data continuation of application No. 13/614,565, filed on Sep. 13, 2012, now Pat. No. 9,106,627, which is a continuation of application No. 11/778,153, filed on Jul. 16, 2007, now Pat. No. 8,347,286.

(58) Field of Classification Search
CPC ......... H04L 67/28; H04L 67/42; H04L 69/14; H04L 65/4084; H04L 65/80
See application file for complete search history.

(56) References Cited

U.S. PATENT DOCUMENTS

| | | | |
|---|---|---|---|
| 6,918,113 | B2 | 7/2005 | Patel et al. |
| 6,941,348 | B2 | 9/2005 | Petry et al. |
| 6,983,330 | B1 * | 1/2006 | Oliveira ................. H04L 69/32 340/2.1 |
| 7,069,271 | B1 | 6/2006 | Fadel et al. |
| 7,082,456 | B2 | 7/2006 | Mani-Meitav et al. |
| 7,089,290 | B2 | 8/2006 | Hennessey et al. |
| 7,150,015 | B2 | 12/2006 | Pace et al. |
| 7,237,239 | B1 | 6/2007 | Goel et al. |
| 7,502,860 | B1 | 3/2009 | Champagne |
| 7,539,762 | B2 * | 5/2009 | Achtermann .......... H04L 67/06 709/218 |
| 7,539,763 | B2 | 5/2009 | Toyota et al. |
| 7,783,773 | B2 | 8/2010 | Wu et al. |
| 7,796,517 | B2 * | 9/2010 | Chen ................. H04L 29/06027 370/230 |
| 7,849,196 | B2 * | 12/2010 | Gkantsidis ............ H04L 67/104 340/2.1 |
| 7,953,843 | B2 | 5/2011 | Cherkasova |
| 8,347,286 | B2 * | 1/2013 | Campbell ............... H04L 67/06 717/178 |
| 8,560,819 | B2 | 10/2013 | Fillipi et al. |
| 8,606,846 | B2 * | 12/2013 | Czechowski, III ... H04L 67/104 709/201 |
| 8,612,630 | B2 | 12/2013 | Kawamoto et al. |
| 8,738,778 | B2 * | 5/2014 | Cohen .................. H04L 67/104 709/227 |
| 8,799,889 | B2 | 8/2014 | Jones et al. |
| 8,886,822 | B2 | 11/2014 | Pedersen et al. |
| 9,106,627 | B2 | 8/2015 | Campbell et al. |
| 9,229,933 | B2 * | 1/2016 | Campbell ............... H04W 4/02 |
| 2001/0047401 | A1 * | 11/2001 | McTernan .............. G06Q 30/02 709/219 |
| 2002/0055980 | A1 | 5/2002 | Gooddard |
| 2002/0138618 | A1 | 9/2002 | Szabo |
| 2003/0037327 | A1 | 2/2003 | Cicciarelli et al. |
| 2003/0046675 | A1 | 3/2003 | Cheng et al. |
| 2003/0212756 | A1 | 11/2003 | Kuroda |
| 2003/0221190 | A1 | 11/2003 | Deshpande et al. |
| 2004/0162901 | A1 | 8/2004 | Mangipudi et al. |
| 2004/0168168 | A1 | 8/2004 | Shah |
| 2005/0027846 | A1 | 2/2005 | Wolfe et al. |
| 2005/0034117 | A1 | 2/2005 | Emaru et al. |
| 2005/0149529 | A1 | 7/2005 | Gutmans |
| 2005/0198631 | A1 | 9/2005 | Bisher et al. |
| 2005/0203851 | A1 | 9/2005 | King et al. |
| 2006/0130053 | A1 | 6/2006 | Buljore et al. |
| 2006/0161966 | A1 | 7/2006 | Nagampalli et al. |
| 2006/0168119 | A1 * | 7/2006 | Inoue ...................... A63F 13/12 709/218 |
| 2006/0265467 | A1 * | 11/2006 | Jang ....................... G06Q 30/02 709/216 |
| 2007/0288604 | A1 | 12/2007 | Achtermann et al. |
| 2008/0229023 | A1 | 9/2008 | Plamondon |
| 2008/0295092 | A1 | 11/2008 | Tan et al. |
| 2009/0024991 | A1 | 1/2009 | Campbell et al. |
| 2009/0064126 | A1 | 3/2009 | Elord et al. |
| 2012/0210310 | A1 | 8/2012 | Cooley et al. |
| 2013/0013744 | A1 | 1/2013 | Campbell et al. |
| 2015/0326643 | A1 | 11/2015 | Campbell et al. |

OTHER PUBLICATIONS

Wills, C. E. et al., Using bundles for Web Content Delivery, The International Journal of Computer and Telecommunications Networking, Aug. 21, 2003, vol. 42, issue 6, pp. 797-817.

Rabinovich, M. et al., DHTTP: An Efficient and Cache-Friendly Transfer Protocol for the Web, IEEE/ACM Transactions on Networking, Dec. 2004, vol. 12, No. 6, pp. 1007-1020.

Olshefski, D. et al., Understanding the management of Client Perceived Response Time, SIG Metrics/Performance 06, Jun. 26-30, 2006, pp. 240-251, Saint Malo, France.

Pang, R. et al., Characteristics of Internet Background Radiation, IMC, Oct. 25-27, 2004, pp. 27-40, Taormina, Sicily, Italy.

Roughan, M. et al., Class-of-Service Mapping of QoS: A Statistical Signature-based Approach to IP Traffic Classification, IMC, Oct. 25-27, 2004, pp. 135-148, Taormina, Sicily, Italy.

Fu et al., Fast and secure distributed read-only file system, Feb. 2002, 24 pages, <http://delivery.acm.org/10.1145/510000/505453/p1-fu.pdf>.

Liu et al., On the impact of concurrent downloads, Dec. 2001, 6 pages, <http://delliver.acm.org/10.1145/570000/564314/p1300-liu.pdf.>.

Veal et al., Performance scalability of a multi-core web server, Dec. 2007, 10 pages, <http://delivery.acm.org/10.1145/1330000/1323562/p57-veal.pdf>.

Office Action (dated Nov. 7, 2011) for U.S. Appl. No. 11/778,153.

Final Office Action (dated May 7, 2012) for U.S. Appl. No. 11/778,153.

Notice of Allowance (dated Aug. 24, 2012) for U.S. Appl. No. 11/778,153.

Notice of Allowance (dated Mar. 30, 2015) for U.S. Appl. No. 13/614,565, filed Sep. 13, 2012, Conf. No. 5942.

Response after Ex Parte Quayle (Feb. 23, 2015) for U.S. Appl. No. 13/614,565, filed Sep. 13, 2012, Conf. No. 5942.

Ex Parte Quayle Action (Dec. 24, 2014) for U.S. Appl. No. 13/614,565, filed Sep. 13, 2012, Conf. No. 5942.

Amendment (dated Oct. 1, 2014) for U.S. Appl. No. 13/614,565, filed Sep. 13, 2012, Conf. No. 5942.

Office Action (dated Jul. 1, 2014) for U.S. Appl. No. 13/614,565, filed Sep. 13, 2012, Conf. No. 5942.

Preliminary Amendment (dated Sep. 28, 2012) for U.S. Appl. No. 13/614,565, filed Sep. 13, 2012, Conf. No. 5942.

Chang et al., A bandwidth sharing theory for a large number of HTTP-like connections, Oct. 2004, 11 pages.

Lin et al., On the performance of persistent connection in modern web servers, 2008, 6 pages.

Yan et al., Client-centered energy savings for concurrent HTTP connections, 2004, 6 pages.

Office Action (dated Mar. 9, 2017) for U.S. Appl. No. 14/805,947, filed Jul. 22, 2015.

Amendment (dated Jun. 7, 2017) for U.S. Appl. No. 14/805,947, filed Jul. 22, 2015.

Final Office Action (dated Jun. 30, 2017) for U.S. Appl. No. 14/805,947, filed Jul. 22, 2015.

Final Amendment (dated Aug. 28, 2017) for U.S. Appl. No. 14/805,947, filed Jul. 22, 2015.

Notice of Allowance (dated Sep. 13, 2017) for U.S. Appl. No. 14/805,947, filed Jul. 22, 2015.

Xu et al., A speed-based adaptive dynamic parallel downloading technique, Jan. 2005, 7 pages.

Wan et al., Asymptotic critical transmission radius and critical neighbor number fork-connectivity in wireless ad hoc networks, May 2004, 8 pages.

\* cited by examiner

MANAGING DOWNLOAD REQUESTS RECEIVED TO DOWNLOAD FILES FROM A SERVER

CROSS REFERENCE TO RELATED APPLICATION

This application is a Continuation application claiming priority to Ser. No. 14/805,947, filed Jul. 22, 2015, now U.S. Pat. No. 9,876,847, issued Jan. 23, 2018, which is a continuation of Ser. No. 13/614,565, filed Sep. 13, 2012, U.S. Pat. No. 9,106,627, issued Aug. 11, 2015, which is a continuation of Ser. No. 11/778,153 filed Jul. 16, 2007, U.S. Pat. No. 8,347,286, issued Jan. 1, 2013.

FIELD OF THE INVENTION

The present invention relates to a method, system and computer program product for managing download requests received for files from a server in a computer infrastructure. In particular, the present invention relates to a method, system and computer program product for managing download requests received for files from a server while minimizing overloading the server.

BACKGROUND OF THE INVENTION

In today's business environment, servers used to provide downloads of software often receive connections from download aids. Typically, these download aids are browser plug-ins that facilitate downloads by using more than one connection to get a file. A download aid can be set up to use thousands of connections and this can lead to overloading the server, thus, leading to what appears to be a denial of service attack in some network environments. As such, there is a need for a business and/or organization to provide cost-effective ways to strengthen their ability to provide downloads of software from a server without overloading the server.

SUMMARY OF THE INVENTION

In a first aspect of the invention, there is provided a method of managing downloads of files from a server in a computer infrastructure while minimizing overloading the server. The method includes presetting, using a download managing tool, a threshold number of allowable connections for each of a plurality of clients requesting connections to download files from a server in a computer infrastructure. The method further includes identifying, using the download managing tool, a respective client of the plurality of clients requesting one or more connections to download a file from the server and tracking, using the download managing tool, whether or not the respective client of the plurality of clients has exceeded the threshold number of allowable connections preset. If the respective client has not exceeded the threshold number of allowable connections preset, allowing the one or more connections up to the threshold number of allowable connections preset for the respective client to download the file from the server and if the respective client has exceeded the threshold number of allowable connections preset, preventing the respective client from connecting to the server, wherein overloading of the server with too many simultaneous active connections is minimized. The method further includes adjusting the threshold number of allowable connections preset for a client of the plurality of clients based on a total number of active connections to the server existing at a given point-in-time. In an embodiment, the identifying step further includes assigning a unique identification to the each of the plurality of clients for accessing the server, maintaining a client identification list that contains one or more unique identifications corresponding to one or more clients of the plurality of clients having one or more active connections to the server, and receiving one or more connection requests from a respective client to download the file from the server, each of the one or more connection requests containing a respective unique identification identifying the respective client. In an embodiment, the tracking step further includes maintaining a counter for monitoring a number of active connections by the respective client of the plurality of clients to the server, and incrementing the counter by one when establishing a connection by the respective client to download a file segment of said file and decrementing the counter by one when ending the connection to download the file segment of the file. In an embodiment, the tracking step further includes determining whether a respective unique identification corresponding to the respective client is contained within the client identification list, and if the respective unique identification is contained within the client identification list, comparing the counter for monitoring the number of active connections for the respective client with the threshold number of allowable connections preset for the respective client. The determining step further includes adding the respective unique identification to the client identification list.

if the respective unique identification is not contained within the client identification list, updating the counter monitoring the number of active connections for the respective client added to the client identification list, and allowing the one or more connections up to the threshold number of allowable connections preset for the respective client to download the file. In an embodiment, the preventing step further includes issuing a connection response message informing the respective client that the server is busy and cannot permit any further connections to the server. Further, the method includes removing the respective client from the client identification list when the counter for monitoring the number of active connections by the respective client equals zero.

In another aspect of the invention, there is provided a system for managing download requests for files from a server that minimizes overloading of the server. The system includes a network communications channel, a server connected to the network communications channel and having deployed thereon a tool for managing download connection requests received by the server from one or more clients connected to the network communications channel for downloading one or more files from the server, the tool being configured to permit a respective client of the one or more clients who has not exceeded a threshold number of allowable connections preset for the respective client to open up one or more connections requested in a download request to the server for downloading a respective file of the one or more files, the one or more connections opened up to the server not exceeding the threshold number of allowable connections preset for the respective client, the tool being further configured to prevent the respective client from opening up the one or more connections requested in the download request to the server for downloading the respective file if the respective client has exceeded the threshold number of allowable connections preset for the respective client, such that overloading of the server with too many simultaneous active connections is minimized. In an embodiment, the tool further includes a configuration module configured to preset a threshold number of allowable connections for each of the one or more clients requesting connections to download files from the server, the configuration module being further configured to adjust the threshold number of allowable connections preset for a client based on a total number of active connections of all of the one or more clients to the server existing at a give point-in-time. In an embodiment, the tool further includes an identification module configured to assign a unique identification to each of the one or more clients for downloading the one or more files from the server. In an embodiment, the tool further includes a list module configured to maintain a list of one or more unique identifications corresponding to the one or more clients having one or more active connections to the server. In an embodiment, the tool further includes a tracking module configured to track whether or not the respective client has exceeded the threshold number of allowable connections preset. In an embodiment, the tool further includes an update module configured to update a number of active connections by each of the one or more clients to the server, the update module further being configured to increment by one the number of active connections for the respective client when establishing a connection of the one or more connections to download a file and further being configured to decrement by one the number of active connections for the respective client when ending a connection of the one or more connections to download the file.

In yet another aspect of the invention, there is provided a computer program product for managing connection requests received for downloading one or more files from a server. The computer program product includes a computer readable medium, first program instructions to preset a threshold number of allowable connections for each of a plurality of clients requesting connections to download files from a server in a computer infrastructure, second program instructions to identify in a connection request received a respective client of the plurality of clients requesting one or more connections to download a file from the server, and third program instructions to track whether or not the respective client of the plurality of clients has exceeded the threshold number of allowable connections, wherein the third program instructions include instructions to allow the one or more connections, up to the threshold number of allowable connections preset, to the respective client to download the file from the server, if the respective client has not exceeded the threshold number of allowable connections preset, wherein the third program instructions include instructions to deny the one or more connections to the respective client to download the file from the server, if the respective client has exceeded the threshold number of allowable connections preset. In an embodiment, each of the first, second and third program instructions are recorded on the computer readable medium, executable by a processor. In an embodiment, the first program instructions further include instructions to assign a unique identification to the each of the plurality of clients for accessing the server and to maintain a client identification list that contains one or more unique identifications corresponding to one or more clients of the plurality of clients having one or more active connections to the server, the first program instructions further including instructions to adjust the threshold number of allowable connections preset for a client of the plurality of clients based on a total number of active connections to the server existing at a given point-in-time. In an embodiment, the second program instructions further include instructions to receive one or more connection requests from the respective client resulting in multiple active connections to download the file from the server, each connection request of the one or more connection requests containing a respective unique identification identifying the respective client. In an embodiment, the third program instructions further include instructions to maintain a counter for monitoring a number of active connections by respective client of the plurality of clients to the server and to increment the counter by one when establishing a connection of the one or more connections for beginning download of a respective file segment corresponding to the file and to decrement the counter by one when closing the connection of the one or more connections for ending download of the respective file segment, the third program instructions further including instructions to remove the respective client from the client identification list when the counter for monitoring the number of active connections by the respective client equals zero. In an embodiment, the third program instructions further include instructions to determine whether the respective unique identification corresponding to the respective client is contained within the client identification list, such that, if the respective unique identification is contained within the client identification list, to compare the counter monitoring the number of active connections for the respective client with the threshold number of allowable connections preset for the respective client and to allow the one or more connections up to the threshold number preset for the respective client, wherein if the respective unique identification is not contained within the client identification list, to add the respective unique identification to the client identification list and to allow the one or more connections up to the threshold number preset for the respective client. In an embodiment, the third program instructions further include instructions to issue a connection response message to said respective client that the server is busy and cannot permit any further connections to the server, if the respective client has exceeded the threshold number of allowable connections preset.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
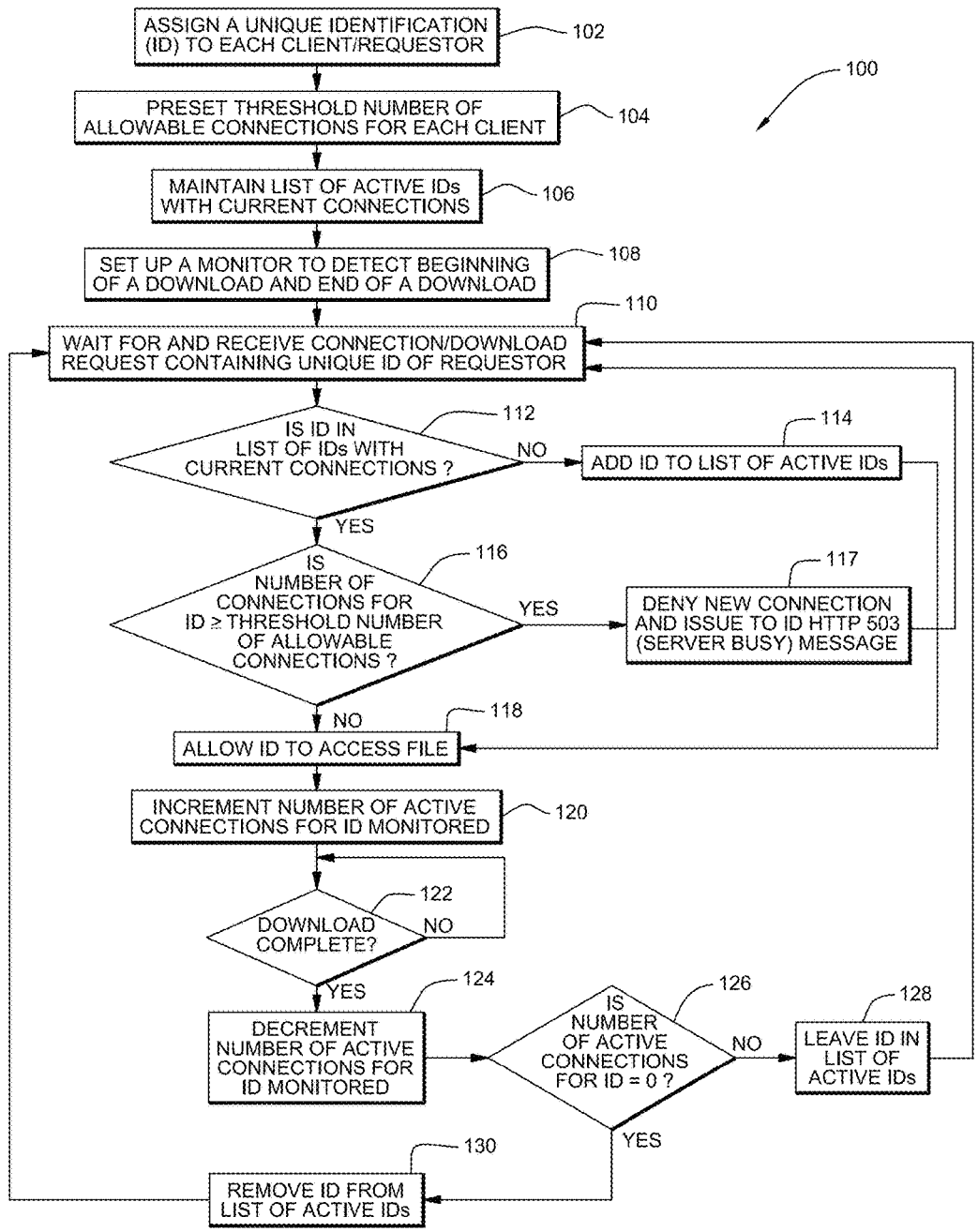
FIG. 1 depicts a flowchart outlining the steps for managing download requests received for files on a server, in accordance with an embodiment of the present invention

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method of managing downloads of files from a server in a computer infrastructure while minimizing overloading the server, as described herein below with respect to FIG. 1. In particular, the invention provides a method of using a download managing tool (also referred to herein as a managing tool or simply referred to as a tool) configured to manage the download requests of files received by a server in a computer infrastructure. Turning to FIG. 1, reference numeral 100 outlines the steps for managing download requests received by a serve for files from one or more clients among a plurality of clients. As shown in step 102 in FIG. 1, the download managing tool determines and assigns a unique identification (ID) to each client or requester requesting a download of one or more files from the server. The unique identification is used to identify a respective client among the plurality of clients requesting one or more connections to download a file from the server. In an embodiment, the unique identification is a ticket, a generated string that uniquely identifies a requestor entitled to download files from a server, which is embedded in the download URL (Uniform Resource Locator). It is understood by one skilled in the art that a client's IP (Internet Protocol) address or URL parameters could also be used to determine a unique identification or identifier. Further, in step 104, the download managing tool, which in an embodiment is deployed on the server, is used to preset a threshold number of allowable connections for each client among the plurality of clients that are permitted to request one or more connections to download files from the server, which in an embodiment is based on a total number of active connections to the server existing at a given point-in-time. In step 106, the download managing tool maintains a list of active IDs corresponding to clients with current connections to the server. Further, the download managing tool tracks (described herein below with respect to steps 108 through 130) whether or not the respective client requesting the download of one or more files has exceeded the threshold number of allowable connections preset in step 104. In particular, the download managing tool in step 108 sets up a monitor to detect the beginning of a download and the end of a download in order to track connections to the server at any given time. In an embodiment, the download managing tool monitors the connect and detects the disconnect of a file transfer, which is typically associated with the start location and the number of bytes specified within a connection request for a file. The download managing tool waits for and receives in step 110 a connection or download request, which contains a unique ID identifying the requestor or client. The download managing tool determines in step 112 whether or not the unique ID is listed in the list of active IDs with current connections maintained, as per step 106. If the unique ID for the request received is not listed in the list of active IDs, then the download managing tool adds the unique ID to the list of active IDs maintained and in step 118, the download managing tool allows the client or requestor with the stated ID to access or download the requested file from the server, using one or up to the threshold number of allowable connections preset for that client in step 104, where each connection is used to download a file segment for a file requested. However, referring to step 112, if the unique ID for the request received is listed in the list of active IDs maintained in step 106, then the download managing tool determines in step 116 whether or not the number of current connections for the client corresponding to the ID is greater than or equal to the threshold number of allowable connections. If the number of current connections for the client corresponding to the ID is greater than or equal to the threshold number of allowable connections, then the download managing tool denies the new connection and issues to the client with the ID a notification or message, such as, an HTTP (Hypertext Transfer Protocol) 503 message, that the server is busy and cannot permit a connection request at that time. It is understood by one skilled in the art that the HTTP specification provides other codes besides HTTP 503 as well as alternatives that can be used to communicate a message to the client that the server cannot permit a connection request at that time. As such, the download managing tool returns to step 110 and waits for another connection or download request. On the other hand, if the number of current connections for the client corresponding to the ID is not greater than or equal to the threshold number of allowable connections, then in step 118 the download managing tool allows the client or requester with the stated ID to access or download the requested file or files from the server, using one or up to the threshold number of allowable connections preset for that client in step 104. In an embodiment, each of the connections used in a request retrieves a file segment of a requested file. The download managing tool increments by one the number of active connections for the ID that is monitored and allowed access to download one or more files requested by the client. In step 122, the download managing tool determines whether or not the download is complete. If the download managing tool determines that the download of the file(s) is completed, the download managing tool decrements by one in step 124 the number of active connections tracked or monitored for the client with the given ID. Further, the download managing tool determines in step 126 whether or not the number of active connections for the client with the given ID is zero. If the number of active connections for the client with the given ID is zero, then the download managing tool removes in step 130 the ID from the list of active IDs maintained and returns to step 110 and waits for another connection or download request. However, if the number of active connections for the client with the given ID is not zero, then the download managing tool leaves in step 128 the ID in the list of active IDs maintained and returns to step 110 and waits for another connection or download request.

Accordingly, for example, if a requestor A is permitted 100 connections at a given point-in-time and wishes to open 50 concurrent connections, which will be established one connection at a time, the download managing tool on the server checks to see if requestor A's unique identification contained in the request received by the server is in the list of active IDs, which lists all clients or requesters with current connections to the server. If requestor A's unique identification is not listed in the list of active IDs, then the download managing tool adds requestor A's unique identification to the list of active IDs and increments the number of concurrent connections as each connection is established and allows the requestor access to download the file using 50 concurrent connections. On the other hand, if requestor A is listed in the list of IDs with current connections to the server, the download managing tool determines whether or not the number of connections for requestor A is greater than or equal to a 100 connections. For example, if requestor A already has 100 active connections, then the download managing tool denies all additional connection requests and issues to requestor A a 'server busy' message, for instance, an HTTP 503 message. On the other hand, for instance, if requestor A already has requested the download of a file using 60 connections and the 60 connections have been allowed by the download managing tool deployed on the server, then the download managing tool limits requestor A to download the requested file using just 40 connections and issues a 'server busy' message for any additional requests, since requestor A's total number of allowable connections is still the threshold number of 100 allowable connections preset for requestor A. Further, the download managing tool increments or increases the number of active connections for requestor A by 1 as a connection is created. Moreover, when the download of a single connection is completed, the download managing tool decrements or decreases the number of active connections for requestor A by 1. Additionally, the download managing tool checks to see if requestor A still has any active connections, and if the total number of active connections for requestor A is zero the download managing tool removes requestor A's unique ID from the list of active IDs. Also, in an embodiment, the maximum or threshold number of allowed or allowable connections per unique identification can be adjusted by the download managing tool running on the server depending on the total number of active connections from all requestors existing at any given time. In an embodiment, the download managing tool utilizes an algorithm to adjust the threshold number of allowable connections. For example, if the total number of active connections to the server by all requestors is less than 400, the threshold number of allowable connections for a requestor could be set or adjusted to a maximum of 100 connections, whereas, if the total number of active connections to the server by all requestors is between 400 and 599, the threshold number of allowable connections for a requestor could be set or adjusted to a maximum of 50 connections. Similarly, if the total number of active connections to the server by all requestors is between 600 and 799, the threshold number of allowable connections for a requestor could be set or adjusted to a maximum of 20 connections less than 400, whereas, if the threshold number of allowable connections to the server by all requestors is over 800 connections, the threshold number of allowable connections for a requestor could be set or adjusted to a maximum of 10 connections. Moreover, in an embodiment, a connection is not severed due to a threshold being reached. For example, using the setup described above, if requestor A is currently downloading a file using 90 connections and the total connections of all requestors exceeds 400 connections, thus leading to an adjustment in the preset threshold, namely, reducing the threshold from 100 to 50 connections, requestor A is allowed to maintain the existing connections. However, if a connection by requestor A ends and a new connection request is received, the download managing tool on the server would issue a server busy response since requestor A would have 89 active connections and the adjustment would allow only 50 connections at that point.

Figure 2:
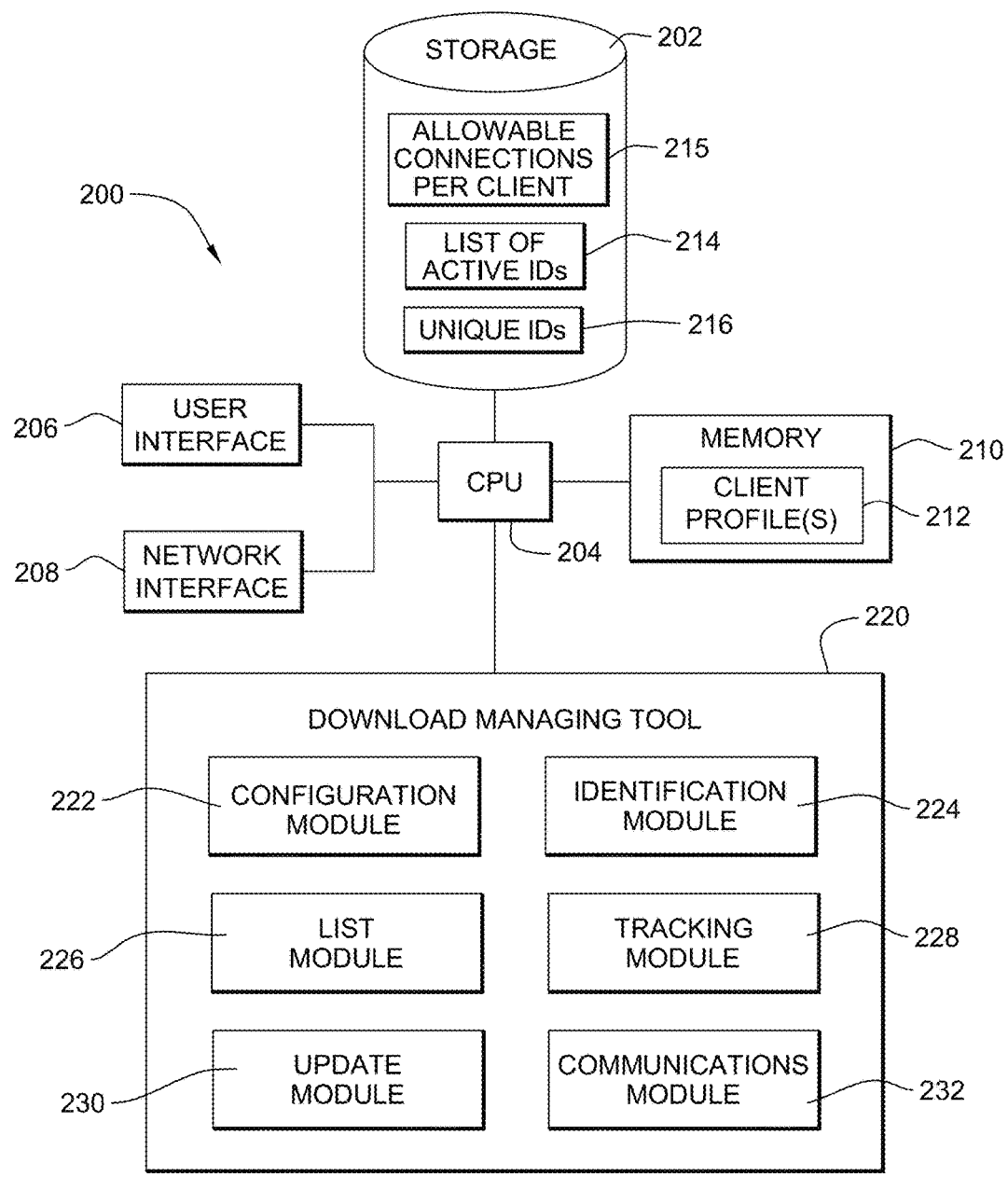
FIG. 2 is a schematic block system diagram illustrating an embodiment of a system for downloading files from a server while minimizing overloading of the server, in accordance with an embodiment of the present invention

In another embodiment, the invention provides a system for managing download requests received by a server for one or more files, for instance, software files from a server on a network, such that overloading of the server is minimized or avoided. Reference is now made to FIG. 2, which illustrates an embodiment of a server 200 for managing the downloading one or more software files while minimizing overloading of the server, in accordance with an embodiment of the present invention. Turning to FIG. 2, FIG. 2 is a schematic block system diagram illustrating one embodiment of a system or server 200 having a download managing tool or code 220 deployed thereon, the download managing tool or code 220 being configured to manage the download of one or more software files, such that overloading of the server is minimized. In an embodiment, the system or server 200 is a file server that has stored thereon one or more downloadable files and has a download managing tool 220 that is deployed and running thereon to manage download requests received for the one or more downloadable files. In an embodiment, the download managing tool 220 is configured to permit a respective client of the one or more clients who has not exceeded a threshold number of allowable connections preset for the respective client to open up one or more connections requested in a download request to the file server 200 for downloading a software file, provided that the one or more connections to the server do not exceed the threshold number of allowable connections preset for the respective client. Further, the download managing tool 220 is configured to prevent the respective client from opening up the one or more connections requested in the download request to the server for downloading the software file if the respective client has exceeded the threshold number of allowable connections preset for the respective client, as describe herein above with respect to FIG. 1, such that, overloading of the file server with too many simultaneous active connections is minimized.

The file server or system 200 includes a central processing unit (CPU) 204, a local storage device 202, a user interface 206, a network interface 208, and a memory 210. The CPU 204 is configured generally to execute operations within the system/server 200, such as, the download managing tool or code 220. The user interface 206 is configured to permit a user, such as, an administrator to interface with the server 200. Further, the network interface 208 is configured, in one embodiment, to facilitate network communications of the server 200 over a communications channel of a network (not shown in any of the drawings). In an embodiment, the local memory 210 is configured to store one or more client or requestor profile(s) 212 that provide information, such as, priority or importance of a client requestor among the multiple clients or requesters requesting download connections to the file server 200. It is understood that other applications that are utilized by the server 200 may be stored in memory 210. Also, in an embodiment, the download managing tool 220 is configured to store the list of active IDs 214 with current connections to the server in storage 202 in the file server 200. Further, in an embodiment, the download managing tool 220 is configured to store a list of the unique identifications (IDs) 216 assigned to each client or requestor in storage 202 in the file server 200. Moreover, in an embodiment, the download managing tool 220 is configured to store a copy of the threshold or maximum number of allowable connections 215 preset for a client or requestor in storage 202.

In one embodiment, as shown in FIG. 2, the download managing tool or code 220 which runs on the file server or system 200 comprises a logic unit that contains a plurality of modules configured to functionally execute the necessary steps for managing download requests for files from a server while minimizing overloading the server. In particular, the download managing tool or code 220 includes a configuration module 222, an identification module 224, a list module 226, a tracking module 228, an update module 230 and a communications module 232. In an embodiment, the configuration module 222 is configured to receive input as to a preset threshold number of allowable connection for each client among the plurality of clients allowed access to the server. Further, in an embodiment, the configuration module 222 is configured to adjust the threshold number of allowable connections preset for a client based on a total number of active connections to the server existing at a given point-in-time. The identification module 224 of the download managing tool or code 220 is configured to assign a unique identification to each of the clients or requestors permitted to access or download files from the server 200. Further, in an embodiment, the identification module 224 is configured to identify a client or requestor of a request received by the file server 200, using the list of unique IDs assigned to clients that are stored, in an embodiment, in local storage 202 of the file server 200. The list module 226 is configured to maintain a list of active IDs corresponding to the clients or requestors with current connections to the file server 200. Further, the tracking module 228 is configured to track or monitor whether or not a client has exceeded the threshold number of allowable connections preset for the client. In an embodiment, the update module 230 is configured to update a number of active connections by each client to the server 200 and to further increment by one the number of active connections for the client when initiating a connection to download a file segment of a software file. Further, in an embodiment, the update module 230 is configured to decrement by one the number of active connections for the client when ending the connection. Additionally, the communications module 232 is configured to permit communication between the various modules of the download managing tool or code 220 and other various components of the server 200.

Figure 3:
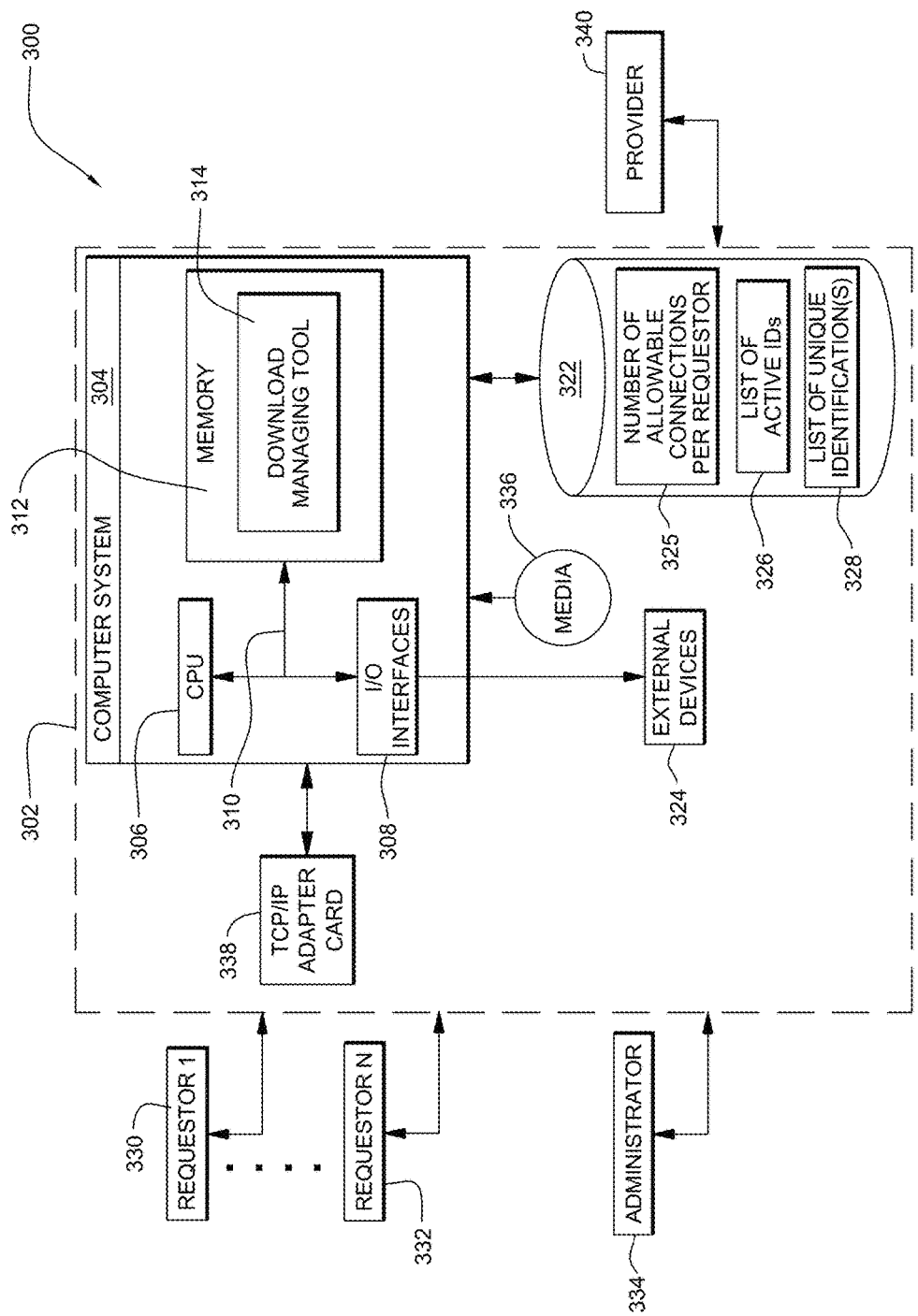
FIG. 3 is a schematic block system diagram illustrating an embodiment of a network infrastructure comprising a computer program product for managing connection requests received for downloading one or more files from a server, in accordance with an embodiment of the present invention.

Referring now to FIG. 3, there is illustrated a computer infrastructure 300 that provides a computer program product for managing connection requests received for downloading one or more files from a server, in accordance with an embodiment of the present invention. The computer program product comprises a computer readable or computer-usable medium, which provides program code, namely, the download managing tool 314, for use by or in connection with a computer or any instruction execution system. The download managing tool or program 314 can be loaded into computer system 304 from a computer readable media 336, such as, a magnetic tape or disk, optical media, DVD, memory stick, semiconductor memory, etc. or downloaded from the Internet via a TCP/IP adapter card 338. As depicted in FIG. 3, system 300 includes a computer infrastructure 302, namely, a file download infrastructure 302, which is intended to represent any type of computer architecture that is maintained in a secure environment (i.e., for which access control is enforced). As shown, infrastructure 302 includes a computer system 304 that typically represents an application server or system 304 or the like that includes an download managing tool or program 314 configured to manage connection requests received from clients for downloading one or more files from the server. It should be understood, however, that although not shown, other hardware and software components (e.g., additional computer systems, switches, routers, firewalls, etc.) could be included in infrastructure 302.

In general, one or more clients or requestors, for instance, client or requestor 1 (reference numeral 330) through client or requestor N (reference numeral 332) can access the application server or system 304, which has deployed thereon the download managing tool 314, which implements the invention. The download managing tool or program 314 is run on the application server 304 to manage the download requests received from any one of the requestors 1 through N (reference numerals 330 through 332) for downloading one or more files from the server 304, as described herein above. As shown in FIG. 3, the application server or system 304 (which has implemented thereon the download managing tool 314) is shown in communication with a general storage or file system or data store 322, which in an embodiment stores the maximum or threshold number of allowable connections 325 preset for each client or requester. Further, in an embodiment, the storage system 322 stores a list of active IDs for clients or requestors with active connections to the server 304. Furthermore, in an embodiment, the storage system 322 stores the list of unique identifications numbers assigned to each of the requestors or clients in order to identify the requester requesting connection to the server. In an embodiment, clients or requestors 1 through N, reference numerals 330 through 332, respectively) access the application server or system 304 over a network via interfaces (e.g., web browsers) loaded on a client, for example, a personal computer, a laptop, a hand-held device, etc. In the case of the latter, the network can be any type of network such as the Internet, a local area network (LAN), a wide area network (WAN), a virtual private network (VPN), etc. In any event, communication with infrastructure 302 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 302. It should be understood that under the present invention, infrastructure 302 could be owned and/or operated by a party such as provider 340, or by an independent entity, which provides a service of managing download requests received from requestors requesting the download of one or more files from the server 304. Regardless, use of infrastructure 302 and the teachings described herein could be offered to the parties on a subscription or fee-basis. In either scenario, an administrator 334 could support and configure infrastructure 302, for instance, for upgrading the download managing tool 314 deployed on the application server or system 304 and/or updating information, such as, for adjusting the predefined or preset threshold or maximum number of allowable connections for a requestor.

The application server 304 is shown to include a CPU (hereinafter "processing unit 306"), a memory 312, a bus 310, and input/output (I/O) interfaces 308. Further, the server 304 is shown in communication with external I/O devices/resources 324 and storage system 322. In general, processing unit 306 executes computer program code, such as the download managing tool 314, as described herein above with respect to FIGS. 1 and 2. While executing computer program code, the processing unit 306 can read and/or write data to/from memory 312, storage system 322, and/or I/O interfaces 308. For instance, in one embodiment, the download managing tool 314 stores a copy of the threshold or maximum number of allowable connections 325 preset for a requestor and the list of unique identifications assigned to requestors 328 in storage 322. Similarly, the download managing tool 314 stores a copy of the list of active IDs corresponding to clients with current connections to the server in storage 322. Alternatively, the threshold or maximum number of allowable connections 325 and/or list of unique identifications assigned to requestors 328 and/or list of active IDs with connections to the server 326 may be stored in a separate storage within the application download infrastructure 302. Bus 310 provides a communication link between each of the components in computer system 300, such that information can be communicated within the infrastructure 302. External devices 324 can comprise any devices (e.g., keyboard, pointing device, display, etc.) that enable a user and/or administrator to interact with computer system 300 and/or any devices (e.g., network card, modem, etc.) that enable server 304 to communicate with one or more other computing devices.

Computer infrastructure 302 is only illustrative of various types of computer infrastructures for implementing the invention. For example, in an embodiment shown, computer infrastructure 302 comprises two or more computing devices (e.g., a server cluster) that communicate over a network to perform the various process steps of the invention. Moreover, computer system 300 is only representative of various possible computer systems that can include numerous combinations of hardware. To this extent, in other embodiments, computer system 300 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 306 may comprise a single processing unit, or be distributed across one or more processing units in one or more locations, e.g., on a client and server. Similarly, memory 312 and/or storage system 322 can comprise any combination of various types of data storage and/or transmission media that reside at one or more physical locations. Further, I/O interfaces 308 can comprise any system for exchanging information with one or more external devices 324. Still further, it is understood that one or more additional components (e.g., system software, math co-processing unit, etc.) not shown in FIG. 3 can be included in computer system 300. However, if computer system 300 comprises a handheld device or the like, it is understood that one or more external devices 324 (e.g., a display) and/or storage system(s) 322 could be contained within computer system 304, and not externally as shown. Storage system 322 can be any type of system (e.g., a database) capable of providing storage for information under the present invention, such as, the list of active IDs 326 utilized by the download managing tool 314. To this extent, storage system 322 could include one or more storage devices, such as a magnetic disk drive or an optical disk drive. In another embodiment, storage system 322 includes data distributed across, for example, a local area network (LAN), wide area network (WAN) or a storage area network (SAN) (not shown). Although not shown, additional components, such as cache memory, communication systems, system software, etc., may be incorporated into computer system 300.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of managing downloads of a file from a server, said method comprising:
   a computer determining whether or not a number of current connections between the server and a client is less than a preset threshold number of allowable concurrent connections between the server and the client, said preset threshold number being an upper threshold number greater than one;
   the computer determining that the number of current connections between the client and the server is at least the preset threshold number and in response, the computer denying a request by the client to download the file from the server using another connection between the client and the server, wherein said denying comprises issuing to the client a message stating that the other connection to download the file from the server is not currently permitted;
   after said denying the request, the computer determining that the number of current connections between the client and the server is less than the preset threshold number and responsive to the request by the client to download the file pursuant to another connection between the client and the server, the computer establishing the other connection between the client and the server and downloading the file to the client via the other connection between the client and the server; and automatically changing, by the computer, the preset threshold number of allowable concurrent connections based on a total number of active current connections between server and both the client and other clients.

2. The method of claim 1 wherein the preset threshold number of current connections includes (a) current connections between the server and the client that are used to download the file from the server to the client and (b) current connections between the server and the client that are not used to download the file from the server to the client.

3. A computer program product, comprising one or more computer-readable hardware storage devices storing program instructions which, upon being executed by a computer, perform a method of managing downloads of a file from a server, said method comprising:

said computer determining whether or not a number of current connections between the server and a client is less than a preset threshold number of allowable concurrent connections between the server and the client, said preset threshold number being an upper threshold number greater than one;

the computer determining that the number of current connections between the client and the server is at least the preset threshold number and in response, the computer denying a request by the client to download the file from the server using another connection between the client and the server, wherein said denying comprises issuing to the client a message stating that the other connection to download the file from the server is not currently permitted;

after said denying the request, the computer determining that the number of current connections between the client and the server is less than the preset threshold number and responsive to the request by the client to download the file pursuant to another connection between the client and the server, the computer establishing the other connection between the client and the server and downloading the file to the client via the other connection between the client and the server; and automatically changing, by the computer, the preset threshold number of allowable concurrent connections based on a total number of active current connections between server and both the client and other clients.

4. The computer program product of claim 3, wherein the preset threshold number of current connections includes (a) current connections between the server and the client that are used to download the file from the server to the client and (b) current connections between the server and the client that are not used to download the file from the server to the client.

5. A computer system, comprising one or more processors, one or more computer-readable memories, and one or more computer-readable hardware storage devices storing program instructions, which upon being executed by the one or more processors via the one or more memories, perform a method of managing downloads of a file from a server, said method comprising said one or more processors determining whether or not a number of current connections between the server and a client is less than a preset threshold number of allowable concurrent connections between the server and the client, said preset threshold number being an upper threshold number greater than one;

the one or more processors determining that the number of current connections between the client and the server is at least the preset threshold number and in response, the one or more processors denying a request by the client to download the file from the server using another connection between the client and the server, wherein said denying comprises issuing to the client a message stating that the other connection to download the file from the server is not currently permitted;

after said denying the request, the one or more processors determining that the number of current connections between the client and the server is less than the preset threshold number and responsive to the request by the client to download the file pursuant to another connection between the client and the server, the one or more processors establishing the other connection between the client and the server and downloading the file to the client via the other connection between the client and the server; and automatically changing, by the one or more processors, the preset threshold number of allowable concurrent connections based on a total number of active current connections between server and both the client and other clients.

6. The computer system of claim 5, wherein the preset threshold number of current connections includes (a) current connections between the server and the client that are used to download the file from the server to the client and (b) current connections between the server and the client that are not used to download the file from the server to the client.

* * * * *